United States Patent [19]
DeMonte et al.

[11] Patent Number: 5,924,759
[45] Date of Patent: Jul. 20, 1999

[54] TARP ENCLOSURE SYSTEM FOR FLAT BED TRUCKS AND TRAILERS

[76] Inventors: Walter P. DeMonte; Tim P. DeMonte, both of 4549 Grand Marais Road East, Windsor, Ontario, Canada, N8W 1X5

[21] Appl. No.: 08/801,501

[22] Filed: Feb. 18, 1997

[51] Int. Cl.⁶ .................................................. B60P 7/02
[52] U.S. Cl. ...................................... 296/100.12; 296/105
[58] Field of Search ........................ 296/100.01, 100.11, 296/100.12, 104, 105

[56] References Cited

U.S. PATENT DOCUMENTS

| | | | |
|---|---|---|---|
| 345,821 | 7/1886 | Abbott | 296/105 |
| 364,034 | 5/1887 | Nye | 296/105 |
| 905,571 | 12/1908 | Pangborn | 296/105 |
| 1,298,733 | 4/1919 | King | 296/98 |
| 1,890,406 | 12/1932 | Pollard | 160/68 |
| 2,486,170 | 10/1949 | Kavanaugh | 296/105 |
| 3,064,667 | 11/1962 | Marino . | |
| 3,868,142 | 2/1975 | Bachand et al. | 296/98 |
| 3,874,721 | 4/1975 | Tuggle | 296/105 |
| 4,023,857 | 5/1977 | Killion | 296/98 |
| 4,157,202 | 6/1979 | Bachand . | |
| 4,981,317 | 1/1991 | Acosta | 296/98 |
| 5,005,896 | 4/1991 | Li | 296/105 X |
| 5,152,575 | 10/1992 | DeMonte et al. | 296/105 |
| 5,238,287 | 8/1993 | Haddad, Jr. | 296/98 |
| 5,292,169 | 3/1994 | O'Brian | 296/98 |
| 5,340,187 | 8/1994 | Haddad, Jr. | 296/98 |
| 5,377,712 | 1/1995 | Lung-Sheng | 135/88.13 |
| 5,388,882 | 2/1995 | Russell et al. | 296/98 |

FOREIGN PATENT DOCUMENTS

| | | | |
|---|---|---|---|
| 108224 | 10/1967 | Denmark | 296/100.12 |
| 361487 | 5/1962 | Switzerland | 296/105 |
| 303683 | 1/1929 | United Kingdom | 296/105 |

OTHER PUBLICATIONS

Cramaro, Tarp–All™—Tarping System for Flatbed Trailers.
Till–Fab Ltd., Roll–Tite™—Flat Deck Tarping Systems.
Cramaro Tarpaulin Systems Ltd.—Anti–Pollution Tarping Systems for Dumps and Semi–Trailers.
Aero Industries, Inc., The Conestoga—Trailer Concept.
Truck & Trailer, The "Roll–Tite System", vol. 6—No. 11, Nov. 1992.
DeMonte Fab. Ltd.,—Quick Draw Tarpaulin Systems™.

Primary Examiner—Dennis H. Pedder
Attorney, Agent, or Firm—Riches, McKenzie & Herbert

[57] ABSTRACT

A retractable enclosure system for covering a bed of a truck, trailer or the like is provided, which includes a number of generally U-shaped bows for supporting a flexible cover, and elongate rails provided along each side of the bed. The rails each have a flat uppermost surface along which the bows move to extend or collapse the flexible cover. The bows span the bed having two vertical legs connected at an upper end by a central bight, and a guide assembly provided at the lower end of each leg. The guide assembly includes one or more supporting wheels which rotatably engage the upper surface of the rails and a guide wheel which rotatably engages the side of the bed and/or a portion of the rail to limit lateral movement of the supporting wheels.

21 Claims, 10 Drawing Sheets

TARP ENCLOSURE SYSTEM FOR FLAT BED TRUCKS AND TRAILERS

SCOPE OF THE INVENTION

This invention relates to a tarp enclosure system, and more particularly to a retractable tarp enclosure system for covering beds of trucks, trailers and the like.

BACKGROUND OF THE INVENTION

Trucks, trailers, railcars, baggage carts and the like have beds upon which cargo is carried.

Typically, the beds have a mostly flat or tabular surface and must be open and accessible for loading and unloading cargo, but otherwise covered during transportation and storage to keep rain, snow and dirt from the cargo, and/or keep debris from the cargo from escaping. A tarp is, therefore, used to cover the cargo when in transit.

Various tarp enclosure systems for truck beds and the like are known. In one enclosure system shown in U.S. Pat. No. 5,152,575 to DeMonte et al, which issued Oct. 6, 1992, a flexible tarp is secured to a series of bows which span the width of the bed. The bows are supported by wheels which are movable along upwardly open U-shaped tracks mounted underneath the side portions of the bed. The support wheels for the bows are rotatable in the U-shaped channels to guide the bows in longitudinal movement along the bed, permitting the tarp to be extended over the bed or collapsed in an accordion-like manner.

A difficulty with conventional tarp enclosure systems exists in that mounting of the channels beneath the bed limits the radial diameter of the support wheels which may be used to the spacing between the track and the underside of the bed. Typically, therefore, conventional tarp systems incorporate one or more 1 or 2" diameter wheels to movably support the bows. The smaller sized wheels tend to bind in the U-shaped channels and are poorly adapted to withstand the higher loads associated with larger bow systems and heavier tarps, making it difficult to slide the bows along the tracks. In this regard, in the prior art, the use of complex pulleys and cable drive systems are generally required to assist in moving the bows along the tracks, complicating manufacture and installation and adding to the overall cost of the tarp enclosure system.

A further difficulty with conventional enclosure systems exists in that the upwardly open U-shaped tracks are particularly prone to the accumulation of leaves, dirt, snow, ice and other such debris therein. The accumulation of debris in the U-shaped tracks or channels interferes with the rotation of the support wheels therein and hinders longitudinal movement of the bows along the track.

In addition, as the tracks are mounted along the underside of the bed, conventional tarp enclosure systems cannot be installed in a variety of existing stepped truck, train and/or trailer beds, which have vertically displaced horizontal surfaces.

On some vehicles, there is only a few inches of space between the tops of the tires and the bottom of the rub rail. Taking the suspension travel into account leaves very little space for mounting tracks along the underside of the bed. In extreme cases, there is no space available at all.

Another difficulty exists in that when the tracks are installed underneath the bed, the tarp covers the sides of the truck bed and the bed rub rail when the tarp is in place extended over the bed. In the extended position, the tarp thereby obscures any reflectors, running lights or reflective material positioned along the sides of the bed as a visual warning apparatus, creating a potential traffic hazard.

SUMMARY OF THE INVENTION

To at least partially overcome the disadvantages of known tarp enclosure systems, the present invention provides a tarp enclosure system having bows movably supported at their lowermost end by support wheels which in movement are guided along a flat top surface of rails provided along the length of each side of the bed.

Another object of the present invention is to provide an inexpensive tarp enclosure system for a truck, trailer or train bed which may be installed easily and quickly and which does not necessitate the use of complex pulley systems and the like.

Another object of the invention is to provide a tarp enclosure system which has a tarp which extends only part-way vertically down the sides of the bed, so as to leave visible, any reflectors, running lights or reflective tape positioned along the lower portions of the bed sides.

Another object of the invention is to provide a tarp enclosure system for a bed which includes a pair of guide rails along which the bows move and, which are configured to shed water, snow and other debris which may otherwise interfere with the movement of the bows longitudinally therealong.

A further object of the invention is to provide a tarp enclosure system in which the tarp supporting bows span the width of the bed and are movably supported by support wheels which have a radial diameter of three or more inches, to minimize the likelihood of the wheels binding as the tarp enclosure system is extended or collapsed.

Another object of the invention is to provide a guide assembly for use in movably supporting the bows of a tarp enclosure system which is adapted to withstand the weight of larger bows.

A further object of the invention is to provide a tarp enclosure system guide rail which allows bow supporting guide wheels to pass over fender cut-outs on low deck trailers.

Another object of the present invention is to provide a tarp enclosure system in which the radial diameter of the bow supporting wheels is not limited by the rail structure along which the bows move.

In one embodiment, a retractable enclosure system for covering a bed of a truck, trailer or the like is provided, which includes a number of generally U-shaped bows for supporting a flexible cover and elongate rails provided along each side of the bed. The rails each have an upper load bearing top surface. The top surface may be curved or grooved, but more preferably is formed as a substantially flat surface which either angles outwardly and slightly downwardly or extends horizontally outward from each side of the bed. The bows span the bed and are characterized by two legs each connected at an upper end by a central bight, and a guide assembly provided at the lower end of each leg. The guide assembly includes one or more support wheels which movably support the bow and which rotatably engage the top surface of the rails for movement longitudinally therealong.

The flexible cover may consist of a woven or mesh screen, a tarpaulin, a canvass sheet or tarp, and is hereinafter collectively referred to as a cover or tarp. The cover is secured to successive bows at spaced intervals, so that the movement of the bows along the rails relative to each other extends or collapses the cover in an accordion-like fashion.

An alignment mechanism is provided as part of the guide assembly to maintain the support wheels on the upper surface of the rails while the bows are moved longitudinally. Preferably, the alignment mechanism is spaced below the top surface of the rail and may, for example, include a guide wheel which rotatably engages part or a side of the bed and/or a portion of the rail to limit lateral movement of the support wheels as they are moved longitudinally. More preferably, the support wheel itself is unconstrained in lateral movement by the rail, with the alignment mechanism providing substantially the sole means by which the support wheel is limited in lateral movement.

One or more bottom wheels may also be provided on each guide assembly to rotatably engage the underside of part of the rail, and maintain the support wheels in contact with the upper surface as the trailer or the like moves over uneven surfaces, such as pot-holed pavement and the like.

Preferably, each rail includes a supporting flange which extends outwardly along the side of the bed. The supporting flange has a generally horizontal tabular upper surface which defines the topmost surface of the rail along which the support wheels rotatably move. More preferably, each rail also includes an outwardly extending flange or one or more other protrusions, which extend outwardly from the bed beyond the supporting flange as a bumper to protect the guide assembly and bow from side impact forces on the sides of the bed.

Accordingly, in one aspect the present invention resides in a retractable tarp enclosure system for covering a bed surface of trucks and trailers and the like comprising, two elongate rail means laterally spaced from each other with one along each side of the bed, each said rail means having an upper surface, wherein the upper surface of each rail comprises a generally flat uppermost surface which is flush with the bed surface, a plurality of generally U-shaped bow means, each having two legs connected by a central bight, and guide means at each end of the legs, each bow means bridging the bed surface from one rail means to the other with the guide means engaging the rail means on each side of the bed for movement longitudinally along the rail means, each said guide means comprising, a support wheel for movably supporting the bow means, the support wheel being rotatable about a substantially horizontal axis and having a circumferential wheel surface which rotatably engages said upper surface as said guide means moves, and alignment means for maintaining the circumferential wheel surface on said upper surface as said guide means is moved longitudinally, said alignment means being spaced below said upper surface and providing substantially the sole means by which said support wheel is constrained in lateral movement, longitudinally extending bumper means projecting outwardly along each side of the bed, said bumper means being spaced beneath said alignment means, and flexible cover means secured to at least some of said bow means, whereby moving the bow means along the rail means relative to each other collapses or expands the cover means in an accordion-like fashion.

In a further aspect, the present invention resides in a retractable tarp enclosure system for covering a top surface of a bed of trucks and trailers and the like comprising, two elongate rail means, one along each side of the bed, each said rail means having a generally flat upper load bearing surface, a plurality of generally U-shaped bow means, each having two legs connected by a central bight, and guide means at each end of the legs, each bow means laterally bridging the bed surface from one rail means to the other with the guide means engaging the rail means on each side of the bed for movement longitudinally along the rail means, each said guide means comprising, a support wheel for movably supporting the bow means, the support wheel being rotatable about a substantially horizontal axis and having a circumferential wheel surface which rotatably engages said upper surface as said guide means moves, alignment means for maintaining the circumferential wheel surface on said upper surface as said guide means is moved longitudinally, said alignment means including a guide wheel spaced below said upper surface and being rotatable about a substantially vertical axis to engage at least one of said rail means and said side of the bed and limit lateral movement of the support wheel, flexible cover means secured to successive bow means at spaced intervals along the cover means, whereby moving the bow means along the rail means relative to each other collapses or expands the cover means in an accordion-like fashion.

In another aspect, the present invention resides in a retractable tarp enclosure system for covering a top bed surface of a truck or trailer bed comprising, two elongate rail means, one along each side of the bed, each said rail means including supporting flange means extending outwardly along each side of the bed, said supporting flange means having a generally horizontal load bearing upper surface, and a flange member extending downwardly from an outward edge portion of the supporting flange means, a plurality of generally U-shaped bow means, each bow means having two legs connected by a central bight, and guide means at each end of the legs, each bow means laterally bridging the bed surface from one rail means to the other with the guide means engaging the rail means on each side of the bed for movement longitudinally along the rail means, each said guide means comprising, a first pair of longitudinally spaced support wheels, each being rotatable about a substantially horizontal axis and having a circumferential wheel surface rotatably engaging said upper surface, guide wheel means for maintaining the pair of support wheels on the upper surface, the guide wheel means being rotatable about a substantially vertical axis and engaging at least one of said rail means and said side of the bed to substantially prevent lateral movement of said guide means, flexible cover means secured at one end to secure to successive bow means at spaced intervals along the cover means, whereby moving a forwardmost or rearwardmost bow means along the track collapses or expands the cover means in an accordion-like fashion.

BRIEF DESCRIPTION OF THE DRAWINGS

Further objects and advantages of the present invention will appear from the following description, taken together with the accompanying drawings in which.

DETAILED DESCRIPTION OF THE DRAWINGS

Figures 1, 2:
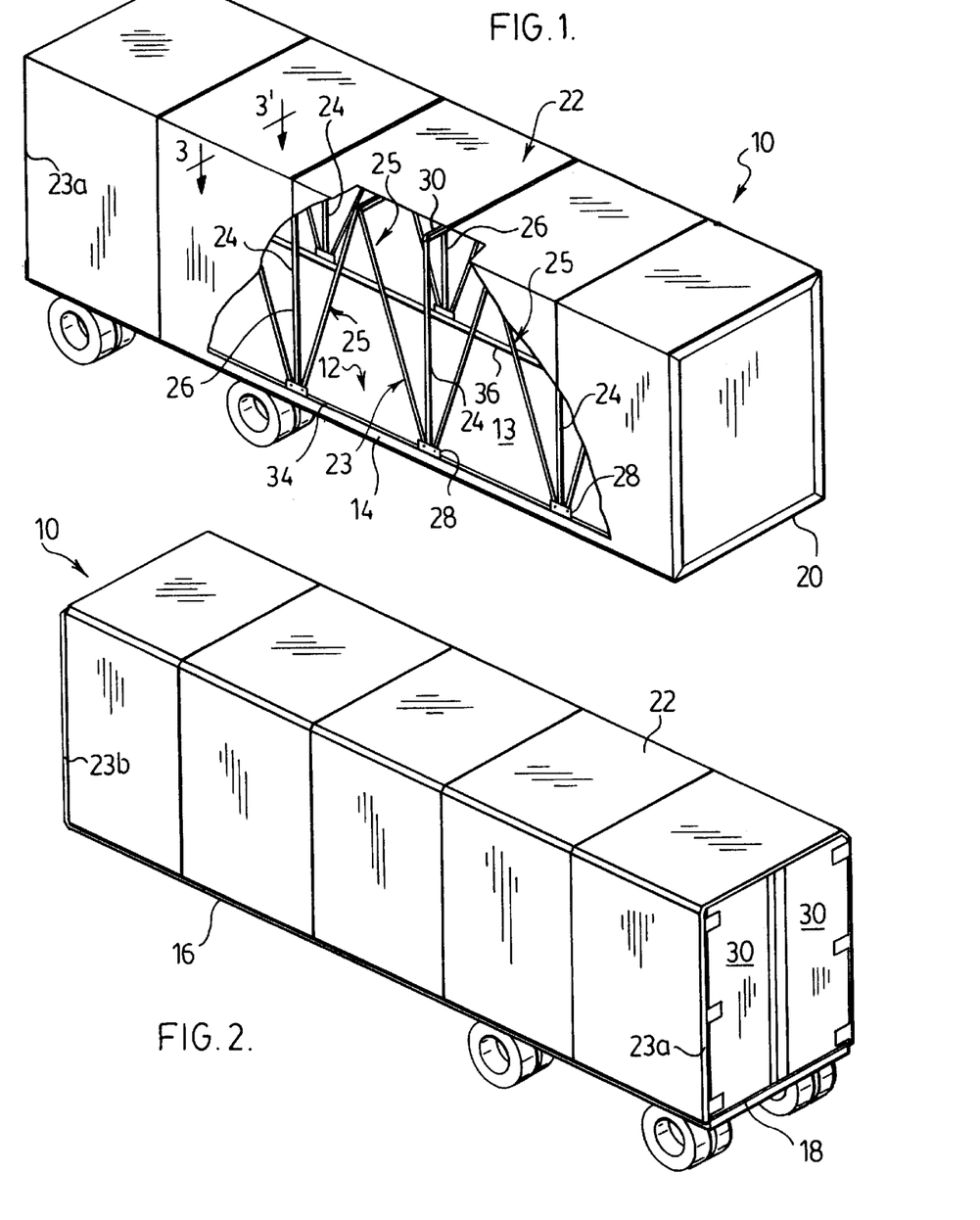
FIG. 1 is a partially cut-away pictorial view of a tarp enclosure system in accordance with a first embodiment of the present invention on a flat bed trailer, with the tarp enclosing system in an extended position.
FIG. 2 is a pictorial view of the rear end of the tarp enclosure system shown in FIG. 1.

Reference is made to FIGS. 1 and 2, showing a pictorial view of a flat bed truck/trailer 10 in accordance with a preferred embodiment of the present invention. The trailer 10 has a bed 12 with substantially flat, horizontal top surface 13, vertical sides 14 and 16, a rear end 18 and a front end 20. In FIG. 1, a retractable, flexible cover 22 is shown in an extended position, covering and preventing access to the bed 12 for transporting cargo (not shown) on top of the bed surface 13. The cover 22 is secured at intervals to a plurality of bow assemblies 23 each consisting of at least one aluminum support bow 24, and optionally, one or more lifter bows 25 all of which laterally bridge the width of the bed 12.

The bows 24,25 have a generally square U-shaped configuration, each including two vertically extending legs 26, joined by a central bight 30. The lifter bows 25 have a square U-shaped configuration similar to that of the support bows 24, and as will be described assist in the movement of the cover 22 to a retracted or storage position.

The lowermost end of the leg 26 of each bow 24,25 in the bow assembly 23 is secured to a guide assembly 28. As will be described hereafter, in this manner, two guide assemblies 28 movably couple the bow assembly 23 in position spanning the bed surface 13. Each support bow 24 is coupled to guide assembly 28 in a fixed, vertically extending orientation. The lifter bows 25 are pivotally coupled at the bottom of each leg 26 to a respective guide assembly 28 by a pivot pin. The pivotal coupling of the bows 25 to the guide assemblies 28 permits movement of the lifter bows 25 between a vertical orientation when the cover 22 is in the storage position, and the inclined position shown in FIG. 1, when the cover 22 is extended or outstretched. In the collapsed storage position, the lifter bows 25 extend vertically above the support bows 24 to assist in taking up any slack in the collapsed cover 22. If desired, the bights of the lifter bows 25 which are located between adjacent support bows 24 may be hingely joined to facilitate movement of the lifter bows 25 between the vertical and inclined positions as adjacent guide assemblies 28 move relative to each other.

Each side 14,16 of the bed 12 is formed by a steel or aluminum rub rail which extends approximately five to ten inches below the bed surface 13. A steel, or more preferably, an extruded aluminum rail 34,36 is mounted along the upper portion of each respective side 14,16 of the bed 12 for supporting the guide assemblies 28 of each bow assembly 23 in longitudinal movement therealong.

FIG. 2 shows best the cover 22 as secured at a rear end to a first end bow assembly 23a and at its front end to a last end bow assembly 23b, which may or may not be removably fixed to the bed 12. The cover 22 is also secured at spaced intervals to each successive bow 24, as for example, by the bows 24 passing through either loops (not shown) in the cover 22, or by securing the edges of individual sections of tarp within channels extending across the bights 30 of each bow 24. On moving a first end bow 23a rearwardly or towards the rear end 18, or forwardly towards the front end 20, the cover 22 extends or collapses in an accordion-like manner. A pair of solid van or "barn" doors 30 are permanently mounted to the rear end 18, which is met by the end bow 23a as the cover 22 is extended.

Figures 3, 4:
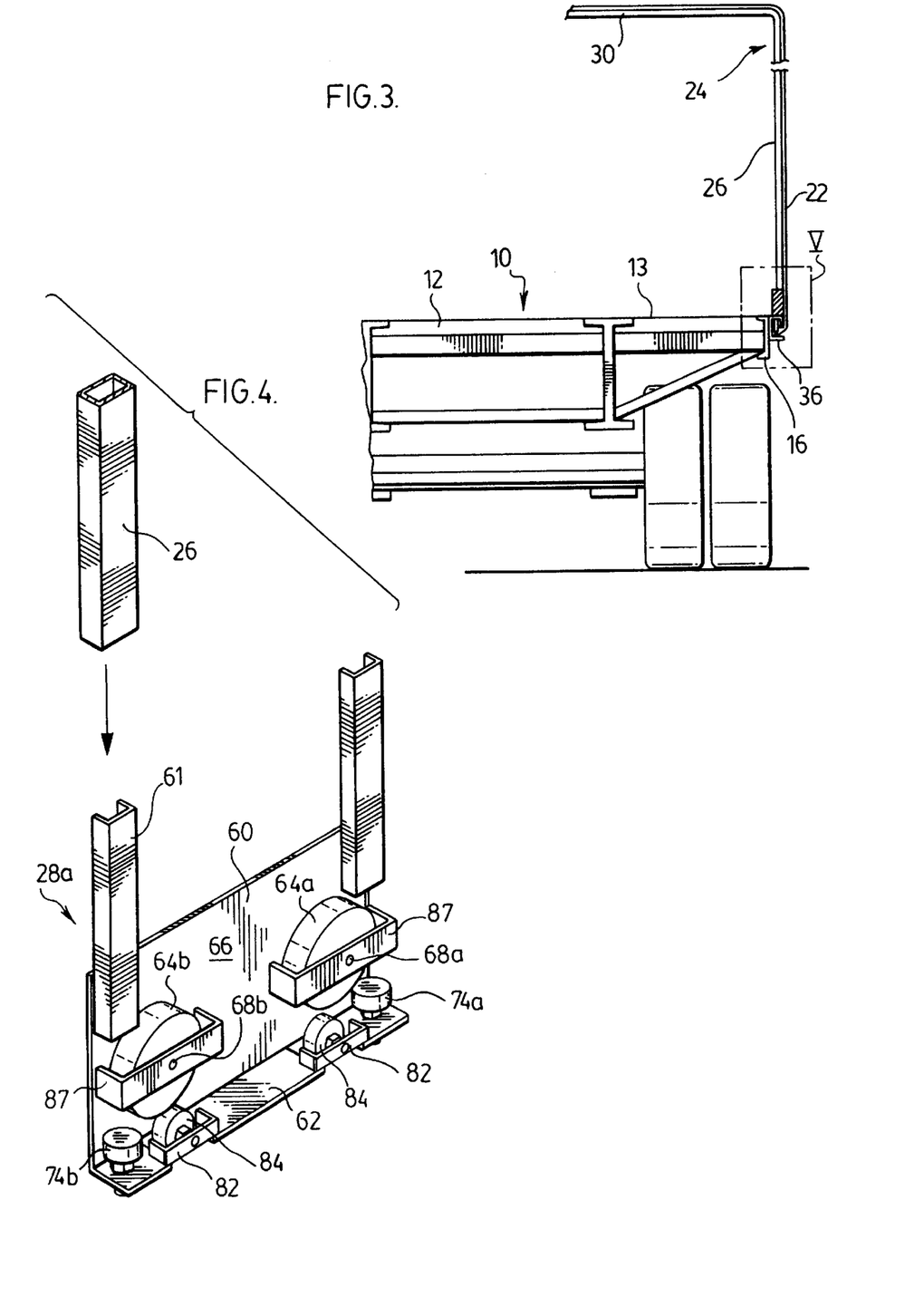
FIG. 3 is a partial cross-sectional rear view of FIG. 1 taken along line 3–3'.
FIG. 4 is an exploded perspective view of a first bow guide assembly for use with the tarp enclosure system shown in FIG. 1.
Figure 5:
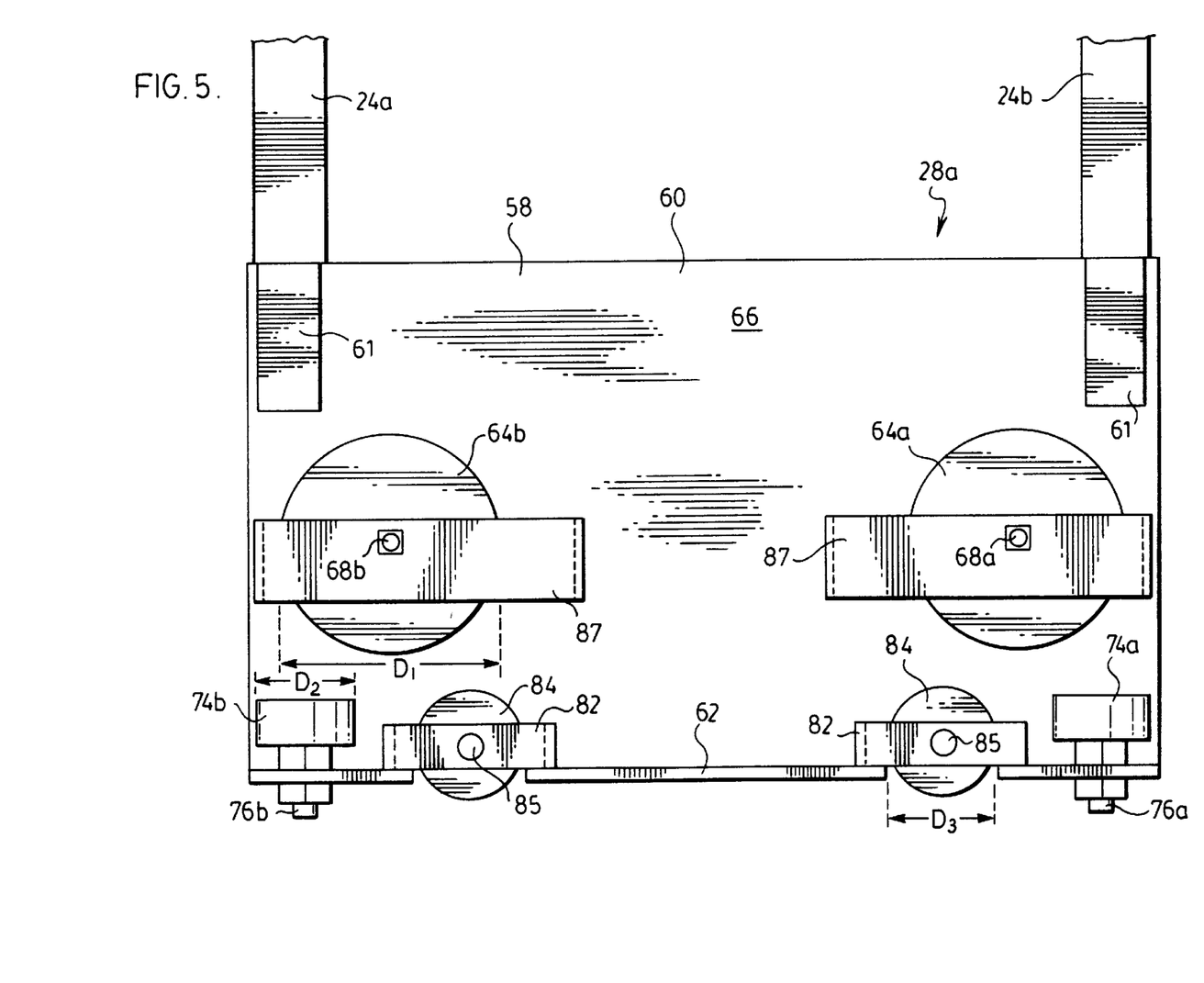
FIG. 5 is a perspective outward facing side view of the guide assembly shown in FIG. 4.
Figure 6:
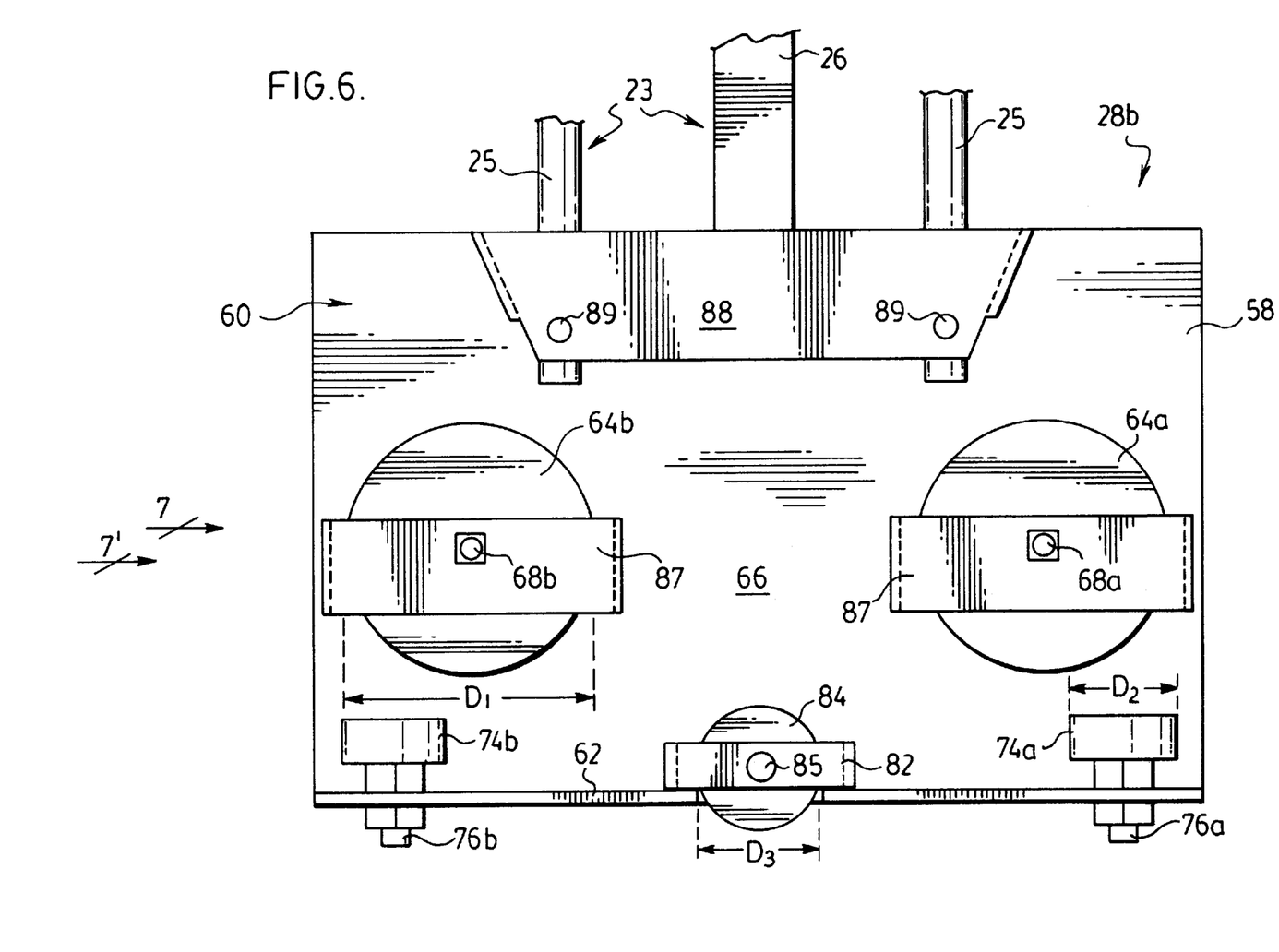
FIG. 6 is a perspective outward facing side view of a second bow guide assembly for use with the tarp enclosure system shown in FIG. 1.
Figures 7, 8:
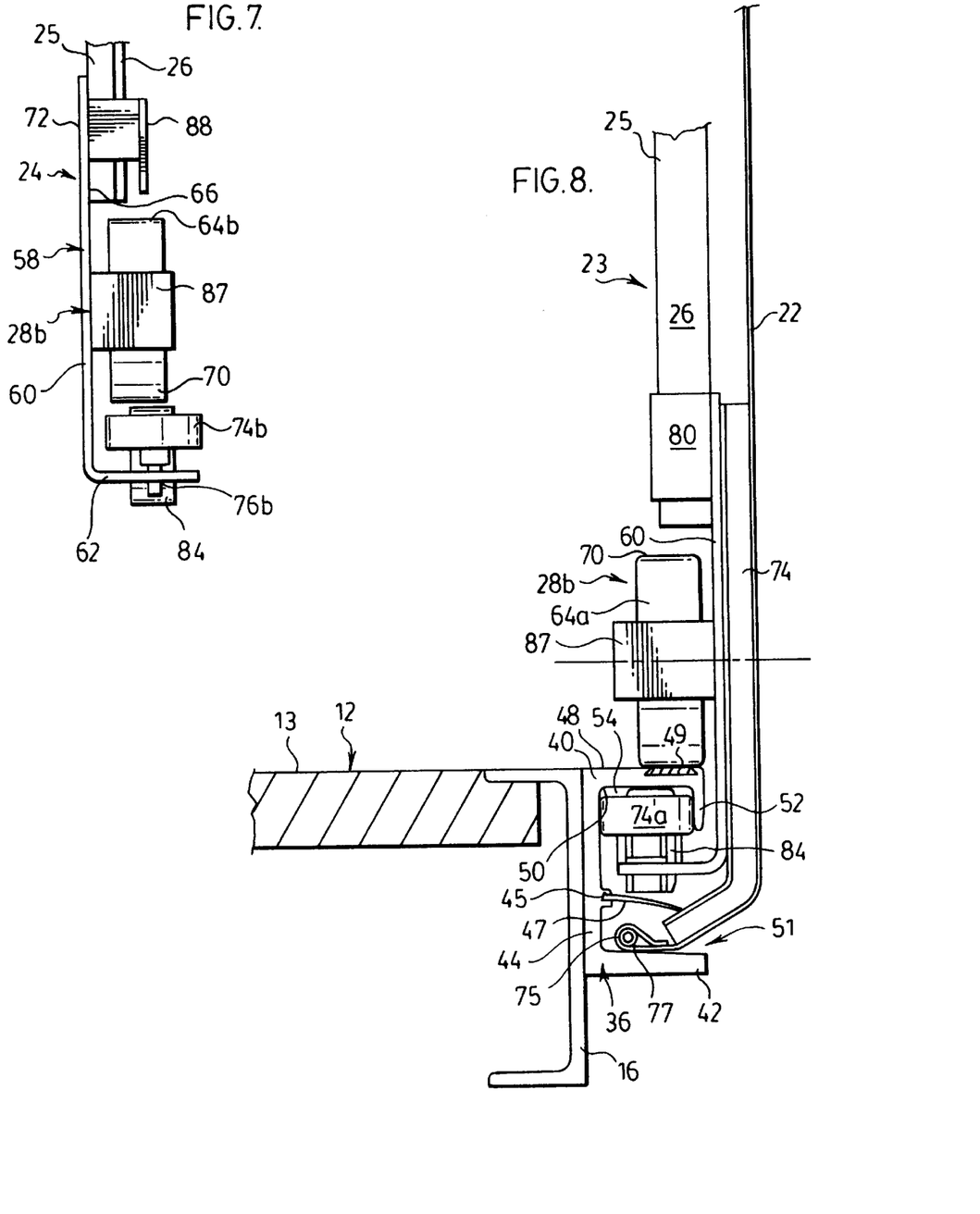
FIG. 7 is a perspective end view of the guide assembly shown in FIG. 6, viewed along line 7–7'.
FIG. 8 is an enlarged schematic rear view of the area indicated as V in FIG. 3.
Figures 9, 10:
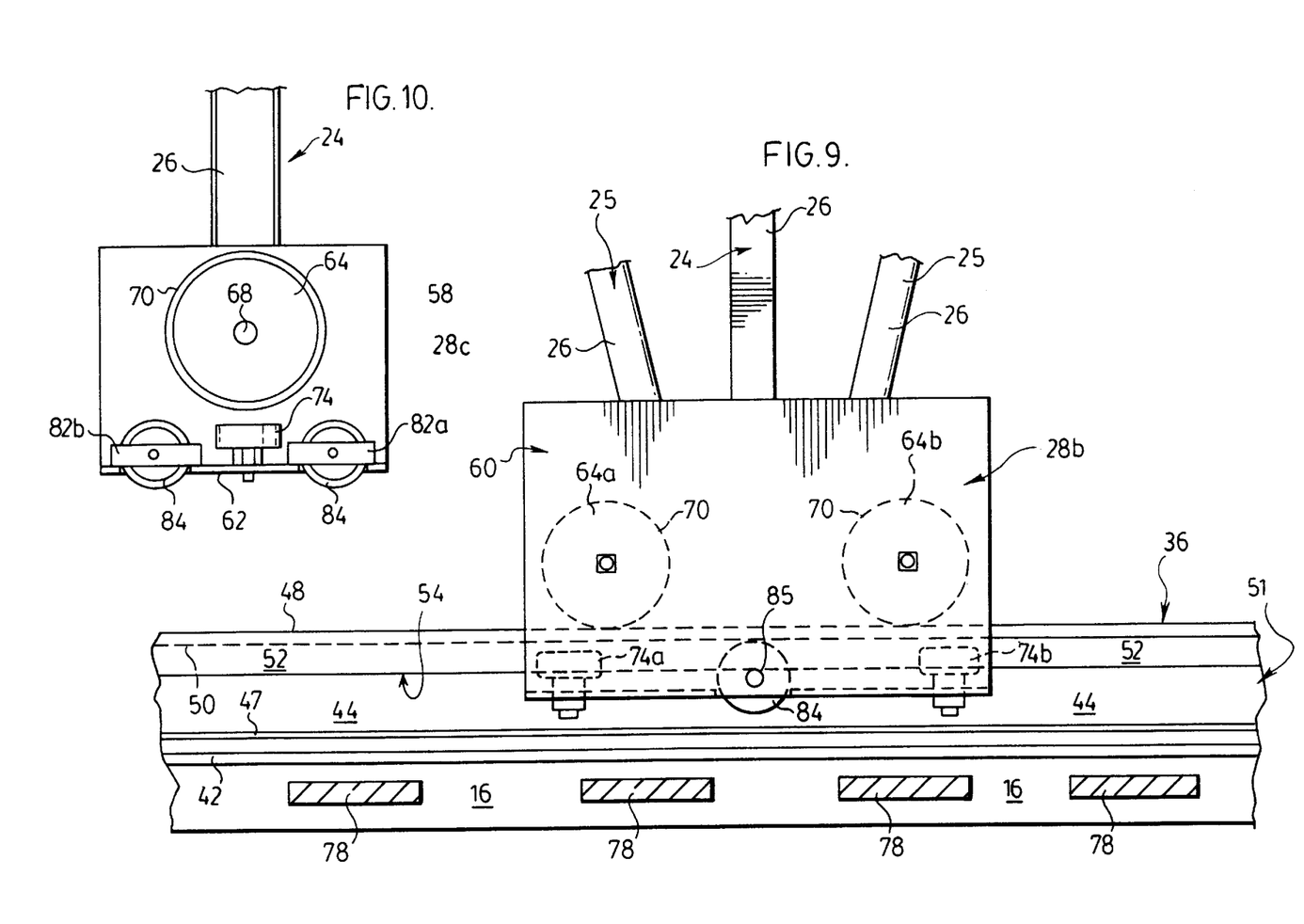
FIG. 9 shows a schematic inward facing side view of the guide assembly of FIG. 7 shown mounted on a rail.
FIG. 10 is a perspective outward facing side view of a guide assembly in accordance with a third embodiment of the invention.

FIGS. 4 and 5 show best an end guide assembly 28a used to support the end bow assemblies 23a,23b and which each include two support bows 24a,24b. FIGS. 6 to 9 show an intermediate guide assembly 28b used to movably support bow assemblies 23 which are located between the end bow assemblies 23a,23b. The guide assemblies 28a,28b have substantially the same construction wherein like references numerals are used to identify like components and are movably mounted to the rails 34,36 in a like manner. In this regard, FIGS. 3, 8 and 9 show coupling of the guide assembly 28b to rail 36, and the mounting of the rail 36 along the side 16 of the bed 12. Although, not shown for clarity, it is to be appreciated that the guide assembly 28a is mounted in a like manner. As well, assemblies 28a,28b coupled to the other legs 26 of the bows 24,25 are similarly movably coupled to rail 34, with the rail 34 mounted along the other side 14 of the bed 12 in a mirror configuration to the mounting of rail 36 to side 16.

Shown best in end view in FIG. 8, the rail 36 consists of a single aluminum extrusion which includes an upper supporting flange 40, a lower bumper flange 42, a connecting web 44 and a guide flange 52, all of which extend substantially the entire horizontal length of the side 16.

The supporting flange 40 and bumper flange 42 are joined at their respective inward edges, closest to the bed 12, by the web 44. The web 44 extends in a generally vertical orientation and is positioned flush against the side 16. The rail 36 thus is secured to the side 16 by welding or by inserting bolts (not shown) through aligned bores formed through the web 44 and the rub rail which forms the side 16. Preferably, the rail 36 is extruded so that the web 44 also defines a longitudinally extending outwardly opening channel 45 which is configured to retain the inward edge of an extruded vinyl weather strip 47. As seen best in FIGS. 3, 8 and 9, the web 44 has a vertical length selected so that the rail 36 extends approximately one-half to two-thirds down the side 16 of the bed 12.

The upper supporting flange 40 extends laterally outwardly from the side 16 and includes generally flat horizontal upper and lower surfaces 48,50. Although not essential, the upper surface 48 may be defined in part by a replaceable nylon wear strip 49 positioned in a complementary shaped groove formed in the flange 40. The upper surface 48 of the supporting flange 40 is provided in a substantially flush or co-planar relationship with the surface 13 of the bed 12 and forms the uppermost surface of the rail 36.

The bumper flange 42 is spaced beneath the supporting flange 40 and consists of a generally rectangular bar which has a marginally downwardly sloping upper surface to facilitate the drainage of water away from the web 44. The bumper flange 42 extends laterally outwardly from the side 16, past the outermost edge of the supporting flange 40, and more preferably beyond the outermost side of the bows 24,25. In this configuration, the bumper flange 42 provides an initial contact surface to absorb side impact forces on the trailer 10 and rail 36, protecting the bows 24,25 and supporting flange 40 from side impact damage.

FIG. 8 shows best the guide flange 52 as projecting vertically downward from the outwardmost edge of the supporting flange 40. The guide flange extends downwardly from the supporting flange 40 part-way towards the bumper flange 42 so as to define an elongated slot 51 between the lower edge of the guide flange 52 and the bumper flange 42. The web 44, lower supporting flange surface 50 and guide flange 52 thus define the sides of a square U-shaped channel 54. The channel 54 opens downwardly towards the bumper flange 42 with the bumper flange 42 partially shielding the channel 54 from snow, ice and other debris. In addition, because the channel 54 opens downwardly, it resists the accumulation of dirt, snow and other debris therein.

FIGS. 5 to 9 show the guide assemblies 28a,28b for use with a first embodiment of the invention. The guide assembly 28a (FIG. 5) is similar to guide assembly 28b (FIG. 6), with the exception that assembly 28a has a greater longitudinal length for increased stability. The guide assembly 28a is used to support the end bow assemblies 23 and is therefore configured to movably support two support bows 24a,24b, whereas the guide assembly 28b is configured to support a single support bow 24 and one or more lifter bows 25. Each of the guide assemblies 28a,28b includes a steel carriage 58 which rotatably supports a pair of spaced plastic support wheels 64a,64b, as well as a pair of guide wheels 74a,74b and either one (quick assembly 28b) or a pair (guide assembly 28a) of keeper wheels 84. The guide wheels 74a,74b and keeper wheels 84 are used to maintain guide assemblies 28a,28b in the correct position on the rail 36.

In the end view shown in FIG. 7, the carriage 58 has an overall L-shape, including a generally vertical sidewall 60. As will be described, the sidewall 60 is secured to the bottom of the leg 26 of the support bow 24 either by welding or by telescoping the leg 26 over shaft 61 (FIG. 4) which is welded to the sidewall. The sidewall 60 merges along its lowermost edge into a horizontal bottom wall 62 which extends inwardly towards the bed 12.

The weight of each bow assembly 23 is carried by the support wheels 64a,64b of each guide assembly 28. The support wheels 64a,64b are rotatably mounted on the inward facing surface 66 of the sidewall 60 on respective pivot shafts 68a,68b. The pivot shafts 68a,68b of guide assembly 28a are spaced on approximately 9 inch centers and are each positioned at longitudinal positions spaced between the shafts 61 and legs 26 of the bows 24. The pivot shafts 68a,68b of the guide assemblies 28b are spaced on approximately 12 inch centers and are provided at longitudinally spaced locations towards the other from the bows 24a,24b. The wheels 64a,64b are rotatable about horizontal axes centred on each pivot shaft 68a,68b. As shown best in phantom in FIG. 9, the support wheels 64a,64b rotate along the upper surface 48 of the rail 36, whereby the circumferential wheel surface 70 of each support wheel 64a,64b rests on the top of the rail 36 to movably support the bow 24. With this construction, the entire weight of each bow assembly 23 rests on the upper surface 48 of the rails 34,36, with the respective upper surfaces 48 functioning as the sole load bearing surface.

Preferably, the support wheels 64a,64b each have a radial diameter D, (FIGS. 5 and 6) of at least about three inches, and more preferably four or more inches. The lateral width of the wheels 64a,64b is selected marginally less than the lateral width of the upper surface 48 to permit substantially unhindered movement of the wheels 64a,64b along the supporting flange 40.

Although not essential, brace plates 87 are provided to reinforce the mounting of the wheels 64a,64b to the carriage 58. The brace plates 87 extend inwardly from the sidewall 60 and across the inward surfaces of each of the wheels 64a,64b.

The guide assembly 28b is further provided with a leg brace 88 (FIGS. 6 and 7) which is also shown extending inwardly from the sidewall 60 and across the bottom portion of the leg 26. The leg brace 88 functions to support the lifter bows 25. As seen best in FIG. 6, each leg brace 88 pivotally supports one lifter bow 25 at locations spaced longitudinally on each side of the leg 26. The lifter bows 25 are pivotally coupled to the brace 88 by the insertion of pivot pins 89 through complimentary sized bores formed in the bottom of each bow 25. The leg brace 88 advantageously further reinforces the coupling of the leg 26 to the guide assembly 28. The brace plate 87 and leg brace 88 provide increased structural integrity to the guide assembly 28, permitting its use with heavier bows 24,25.

The pivot shafts 68a,68b are spaced a distance from the bottom wall 62, having regard to the radial diameter D, of the support wheels 64a,64b, so that when the circumferential wheel surfaces 70 rest on the upper surface 48, the bottom wall 62 extends inwardly towards the bed 12 and through the slot 51. With this configuration, the bottom wall 62 extends between the lowermost edge of the guide flange 52 and the bumper flange 42, to a position beneath the channel 54.

The guide wheels 74a,74b are rotatably mounted to the bottom wall 62 on a respective pivot shafts 76a,76b for rotation about vertical axes. The guide wheels 74a,74b each have a radial diameter $D_2$ (FIGS. 5 and 6), which is marginally less than the minimum spacing between the web 44 and flange 52. The pivot shafts 76a,76b mount each guide wheel 74 on the bottom wall 62, so that when the circumferential surface 70 of each support wheel 64a,64b engages the upper surface 48, the guide wheels 74a,74b locate in the channel 54 and engage the guide flange 52 and/or the web 44. In this manner, the engagement of the guide wheels 74a,74b with the vertical sides of the channel 54 defined by the flange 52 and/or web 44 limits the lateral movement of the guide assembly 28 relative to the rail 36. The result is, therefore, that the support wheels 64a,64b are maintained in position centred on top of the upper surface 48 as the bow 24 is moved longitudinally along the rail 36. Because the guide wheels 76a,76b maintain the support wheels 64a,64b aligned on the upper surface 48, there is no need to provide the upper surface 48 with flanges to engage the sides of the support wheels 64a,64b to limit lateral movement.

It is to be appreciated that with the structure of the rail 36 shown in FIG. 8, almost no part of the rail 36 extends above the upper surface 48 to limit lateral movement of the support wheels 64a,64b. As such, the uppermost surface of the rail 36 is positioned flush with the bed surface 13. The support surface of the rail 36, thus, does not extend above the bed surface 13 where it may otherwise interfere with the loading and off-loading of cargo.

FIG. 5 shows two bottom keeper wheels 84 as being mounted in the guide assembly 28a at locations spaced longitudinally along the bottom wall 62. FIG. 6 shows the guide assembly 28b as having a single bottom keeper wheel 84 mounted directly beneath the leg 26. The keeper wheels 84 of each guide assembly 28a,28b are mounted on a pivot shaft 85 for rotation about a horizontal axis. The pivot shaft 85 extends through the wheel 84 and a flange 82, which extends upwardly from the bottom wall 62 on one side of the keeper wheel 84. The wheel 84 has a width and radial diameter $D_3$ (FIGS. 5 and 6) selected equal to or marginally smaller than that necessary to rotatably engage the lower surface 50 of the supporting flange 40 when the circumferential surface 70 of each wheel 64a,64b is moved against upper surface 48. In this manner, the bottom wheel 84 maintains the support wheels 64a,64b on the upper surface 48 of the supporting flange 40 as the trailer 10 passes over bumps, pot holes and the like or if the support bow 24 tilts slightly.

As the support wheels 64a,64b move along the uppermost surface of the rail 36, neither the bed 12 nor part of the rail 36 overlies the support wheels 64a,64b. Because the support wheels 64a,64b are offset from a position directly beneath the bottom of the bows 24,25, larger support wheels 64a,64b may be provided. As such, comparatively larger support wheels 64 having a radial diameter of four inches or even larger may be used. In addition, because the support wheels 64a,64b move along the flat upper surface 48 of the rails 34,36, the lateral width of the support wheels 64a,64b are not constrained by the size of any guide channels provided on the supporting flange 40. Wider support wheels 64a,64b may therefore be used, providing better load distribution.

The larger radial diameter $D_1$ of the support wheels 64 increases the ease by which the bow assemblies 23 may be moved in collapsing and extending the cover 22, reducing the need for complex pulley mechanisms and the like. In addition, the use of larger diameter support wheels 64 advantageously eliminates the need to provide specially machined steel wheels, permitting the use of wheels which are purchased off-the-shelf, further reducing manufacturing costs.

It is to be appreciated that with the construction shown in FIGS. 4 to 8, the longitudinal spacing of the support wheels 64a,64b combined with the bottom wheel 84 act to maintain the legs 26 of the support bows 24 in a substantially vertical orientation, eliminating the need to brace adjacent bows 24 and the like. The larger diameter and longitudinal spacing of the support wheels 64a,64b, advantageously provides increased vertical stability to the bows 24 as they are moved.

FIG. 8 shows the cover 22 secured over the outward facing surface 72 of the carriage sidewall 60 by a tarp clip 74. The lowermost edge of the clip 74 bends inwardly into the slot 51 so as to engage the outermost edge of the weather seal 45. The cover 22 extends from the bight 30 downwardly over the clip 74 to its lower edge 75. As seen best in FIG. 8, when the cover 22 is extended, its lower edge 75 locates at a position below the weather stripping 47 abutting the bumper flange 42. The lower edge 75 of the cover 22 may be held in place adjacent the bumper flange 42 by the use of a weighted seam 77 formed by sewing a flexible plastic tube into the bottom edge of the cover 22. In this manner, when the cover 22 is extended, its lower edge 75 locates near the bumper flange 42 of each rail 34,36. The positioning of the lower edge 75 and the weather stripping 47 keep the wheels 64,74,80, channel 54 and supporting flange 40 substantially free of debris. In addition, because the sizing of the web 44 is selected so that the bumper flange 42 locates about halfway down the sides 14,16 of the trailer 10, reflective tape 78 (FIG. 9) or other warning lights or reflectors positioned along the bottom portion of the sides 14,16, beneath the rails 34,36 remains readily visible.

Because each support wheel 64 moves along the flat upper surface 48 of the supporting flange 40, there is no track or channel to collect water, dirt and/or snow, minimizing the likelihood that the support wheels 64 will become jammed as the bows 24 are moved along the rails 34,36. If desired, the supporting flange 40 and/or bumper flange 42 may be provided with a marginally downward and outward sloping upper surfaces to further facilitate the shedding of water and debris from the rails 34,36.

Figure 11:
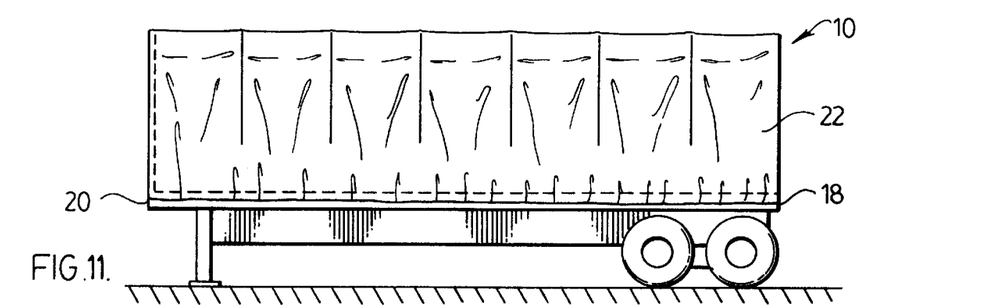
FIGS. 11, 12, 13 and 14 are schematic side views of the tarp enclosure system of FIG. 1, varying only in respect to the manner in which the tarp is collapsed.
Figure 12:
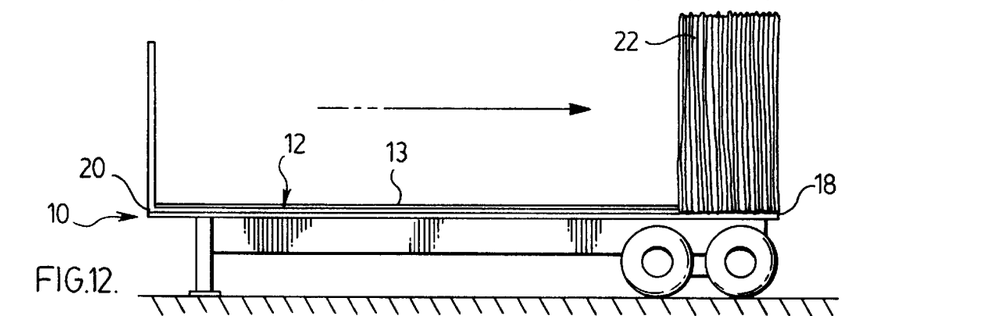
Figure 13:
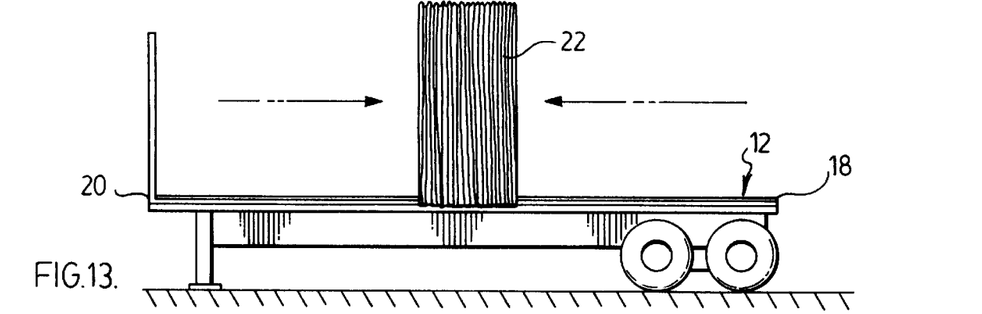
Figure 14:
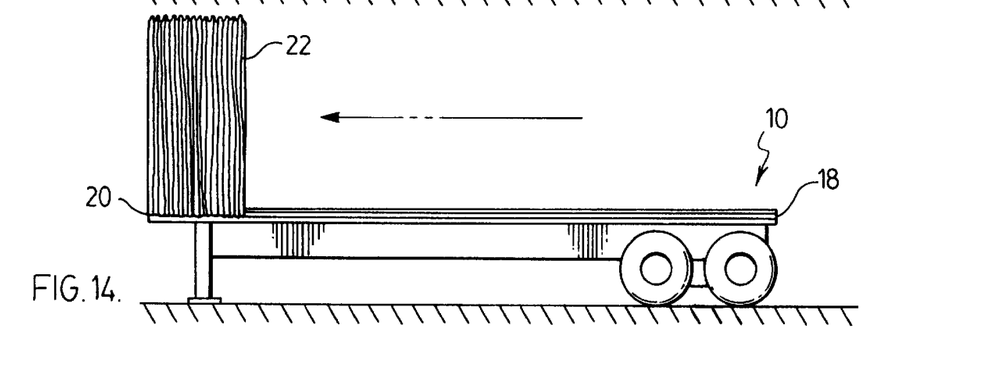

As is known, the present invention permits the cover 22 to be fully extended as shown in FIG. 11 to cover machinery positioned on the bed surface 13, or collapsed at either the rear end 18 or front end 20 of the bed 12, as is shown in FIGS. 12 and 14, or alternately at a position spaced therebetween in the manner shown in FIG. 13. To operate the cover, a person need only to manually draw either the forwardmost bow assembly 23a or its guide assembly 28a or the rearwardmost bow assembly 23b or its guide assembly 28a on one side of the bed 12, so as to move the bows 24,25 towards the fully extended position shown in FIG. 1, or a fully retracted collapsed position. While normal manual grasping and drawing is sufficient, if desired, a cable drive system such as that shown in U.S. Pat. No. 5,152,575 to DeMonte et al, which issued Oct. 6, 1992, could also be employed for either manual, electrical, pneumatic or hydraulic powered operation.

Reference is now made to FIG. 10, which shows a guide assembly 28c in accordance with a further embodiment of the invention, and wherein like reference numerals are used to identify like components. The guide assembly 28c is used to secure the intermediate bows 24 to the rails 34,36 which are coupled to sides 14,16 of a trailer 10 in the identical manner as that shown in FIG. 5. The guide assembly 28c of FIG. 11 is similar to the embodiment shown in FIG. 7 with the exception that the assembly 28c is characterized by a single support wheel 64, a pair of bottom keeper wheels 84 longitudinally offset on each side of the bow leg 26 and a single guide wheel 74 aligned beneath the bow leg 26.

The guide assembly 28c shown in FIG. 10 moves along the rails 34,36 in essentially the same manner as that of the guide assemblies 28a,28b shown in FIGS. 4 and 7, with the support wheel 64 rotatably engaging the upper surface 48, the keeper wheels 84 engaging the lower surface 50 and the guide wheel 74 rotatable along channel 54.

It is to be appreciated that the guide assembly 28 preferably includes at least either the combination of two longitudinally spaced guide wheels 64 and one keeper wheel 84, or two longitudinally spaced keeper wheels and one guide wheel 64. With either of these configurations, the guide assembly 28 may be used to support the leg 26 of the bow 24 in a vertical orientation on the respective rail 34,36.

While the preferred embodiment of the invention shows the upper surface 48 of the supporting flange 40 as being substantially co-planar with the surface 13 of the bed 12, the invention is not so limited. If desired, the upper surface 48 could be provided at a position spaced above or below the bed surface 13.

Another embodiment of the invention is shown in FIGS. 15 to 18, which illustrates a trailer having a stepped bed 12 which has a number of vertically offset horizontal surfaces 13a, 13b, as for example, is used in the transport of heavy construction equipment and the like. FIGS. 15 to 18 show the enclosure system with the cover removed for clarity and wherein like reference numerals are used to identify like components.

In the embodiment shown, individual rail sections 34a, 34b and 36a,36b are secured along each respective lower and upper side section 14a, 14b and 16a, 16b of the trailer 10. The rail sections 14a,14b and 16a,16b are identical to the rails 14 and 16 described with reference to FIG. 1 and are secured to the side sections 14a,14b and 16a,16b in a like position and manner. As seen best in FIG. 15, each of the rail sections 34a and 36a have a length selected slightly shorter than the upper side sections 14a, 16a, and when mounted to the bed 12, leave a gap 88 between the ends of the rail sections 34a,36a and rear edge 90 of the surface 13a.

The end bow assemblies 123a, 123b and intermediate bow assemblies 123 are movable over the lower surface 13b along the rail sections 34b,36b in the manner described with reference to FIGS. 1 to 14. FIGS. 15 to 18 show the forwardmost end bow assembly 123b as further carrying two guide rail segments 94,96 each projecting forwardly therefrom. The rail segments 94,96 project forwardly a distance approximately equal to that of the gap 88, and are mounted at a height to abuttingly engage the ends of the rail sections 34b,36b, respectively, when the end bow assembly 123b is moved to a forwardmost position over the surface 13b. A wedge shaped aluminum guide plate 98 is mounted to each of the legs of the bow assembly 123b at a position slightly above and inwardly from the rail segments 94,96. Although not essential, a lifter bow 25' (FIG. 18) is mounted to the forwardmost support bow 24 on the bow assembly 123b so as to pivot forwardly over the surface 13a when the bows 24,25 are fully extended.

A forwardmost end bow 124a and intermediate bow 124 are movable along the rail sections 34b,36b. The bows 124b and 124 have essentially the same construction as the bows 24b,24 but have a shorter height having regard to the distance the surface 13a is raised above surface 13a.

Figure 18:
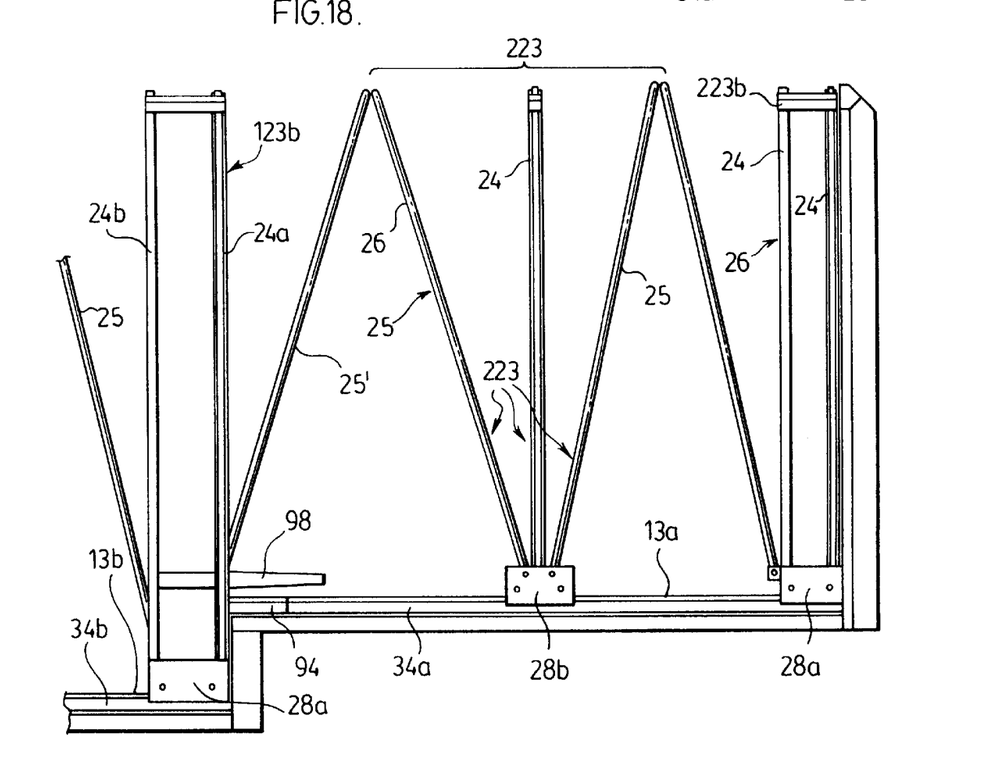
FIG. 18 is a partial perspective side view of the tarp enclosure system shown in FIG. 17, wherein the forward-most end of the enclosure system is moved to an extended position covering the front of a stepped flat bed trailer.

FIG. 18 shows the orientation of the bows 24,25 in a fully extended position. To fully retract the cover, the forwardmost bow assembly 223b is moved rearwardly along the rails 34a,36a to slide all of the guide assemblies 28a 28b thereon off of the rail segments 34a,36a and onto rail segments 94,96. When the upper section bow assemblies 223b,223 are moved onto the rail segments 94,96, the guide plates 98 act to assist in maintaining the bows in position suspended on the bow assembly 123b. In this manner the bow assemblies 223b and 223 are supported and carried by the bow assembly 123b, and may move therewith over the section 13b to the position shown in FIG. 15. To close the cover, the bow assemblies are simply moved in the opposite direction.

It is to be appreciated that the simplified design of the rails 34,36, advantageously facilitates simplified installation, maintenance and cleaning, in so far as there are no channels which tend to collect debris, snow and/or ice. As only the uppermost portion of the outside rub rails are required for track installation, the rails 34,36 may be installed easily and quickly with minimal modifications to the trailer 10.

Figure 15:
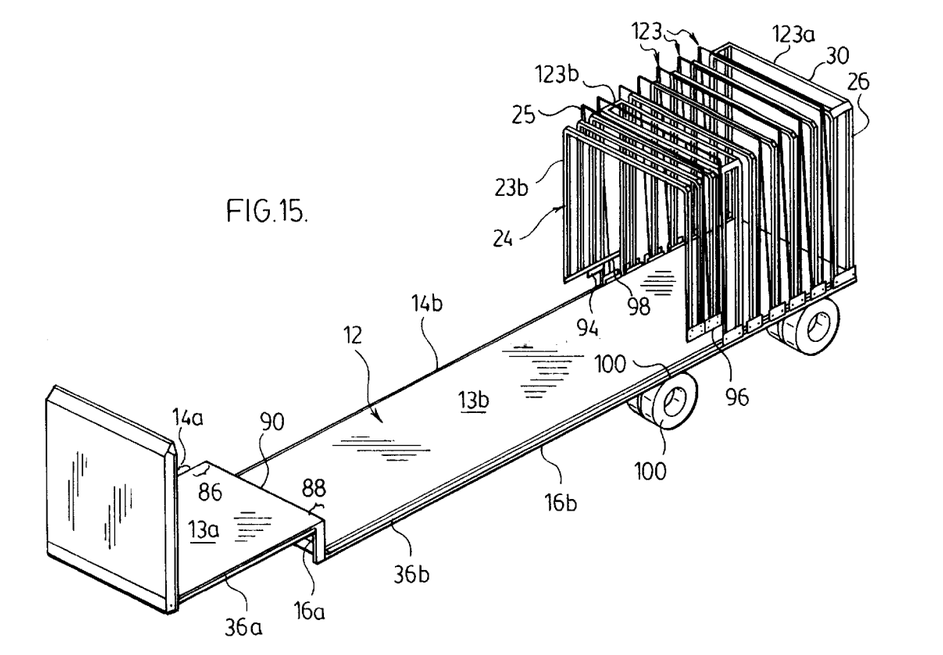
FIGS. 15, 16 and 17 are perspective views of a tarp enclosure system in accordance with a further embodiment of the invention for use on a stepped flat bed trailer, varying with respect to the movement of the bows for loading and off-loading cargo, and wherein the tarp is not shown for clarity.
Figure 16:
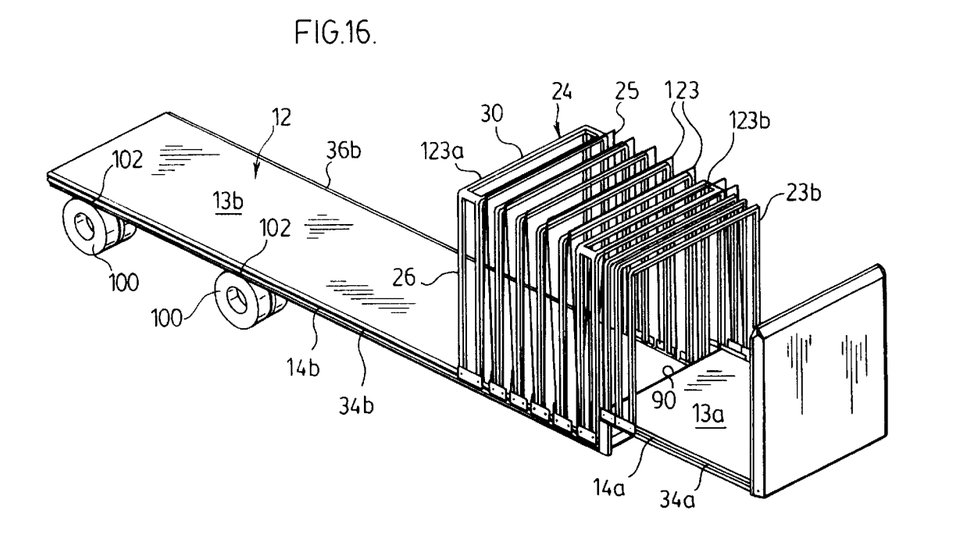
Figure 17:
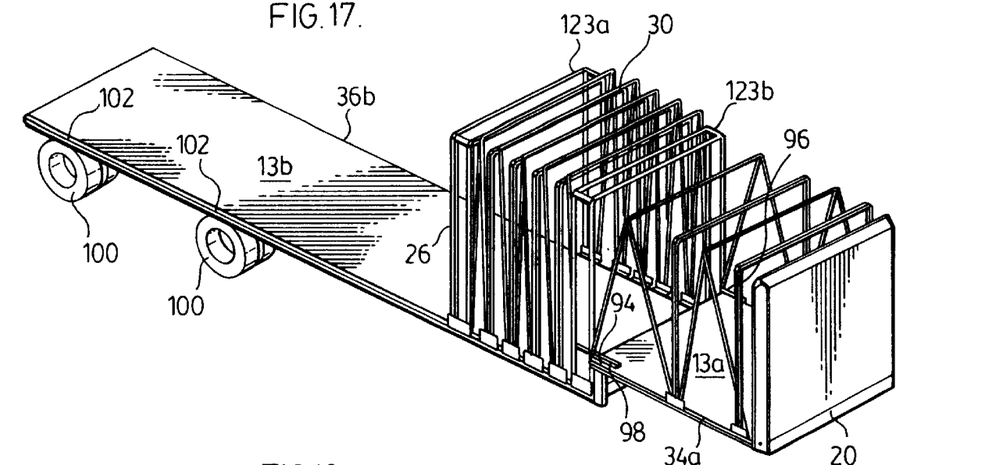

FIGS. 15 to 17 show a further advantage of the present invention when used with low deck trailers. In particular, because the guide assemblies 28 move along the upper surface 48 of the rails 34,36, if additional clearance is needed for suspension travel, the protective bumper 46 can be cut away above the trailer wheels 100 so as to include cutouts 102. The guide assembly can pass over any cutouts 102 in the bumper portion 46 because they only require the upper portion of the rails 34,36 to function.

Figure 19:
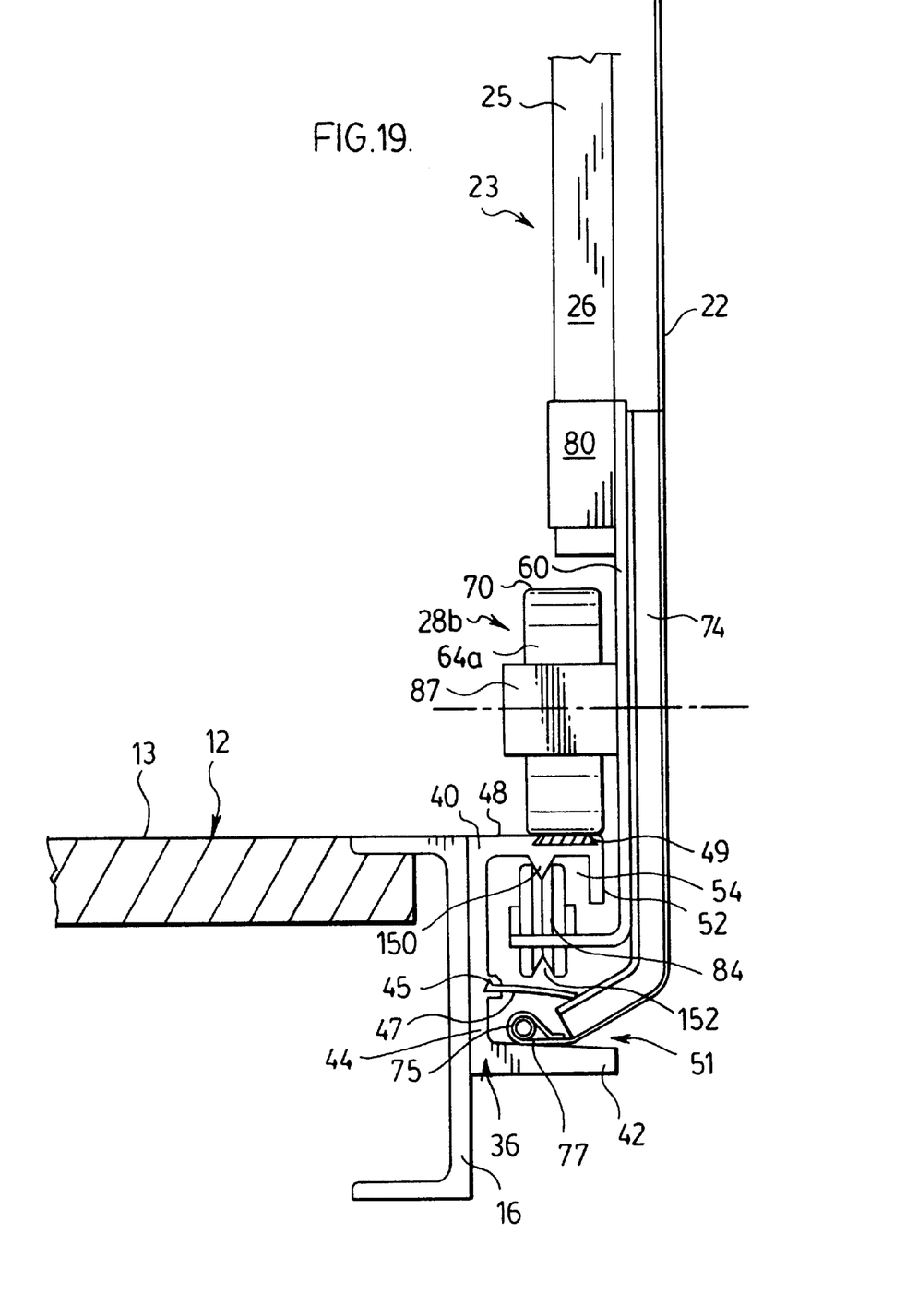
FIG. 19 is an enlarged schematic rear view of the area indicated as V in FIG. 3 in accordance with a further embodiment of the invention.

While FIGS. 4 to 10 illustrate the use of guide wheels 74 to maintain the alignment of the guide assemblies 28 on the rails 34,36, other apparatus used to maintain the alignment of the support wheels 64 over the rails 34,36 are possible and will become apparent. FIG. 19 shows one possible modified guide assembly in a similar end view to that shown in FIG. 8, and wherein like reference numerals are used to identify like components.

In FIG. 19, the lower surface of the supporting flange 40 is provided with a downwardly projecting rib 150 which extends part way into the channel 54 along the length of the rail 36. The rib 150 is shown having a generally triangular profile extending downwardly to a point approximately mid-way between the web 44 and the guide flange 52, however, other rib configurations are equally possible. The bottom keeper wheel 84 is provided with a V-shaped groove 152 in its circumferential surface. The groove 152 has a complimentary shape to the rib 150 so that when the guide assembly 28 is positioned with the support wheels 64 on the flange 40, the rib 150 locates snugly within the groove 152 of the wheel 84 in the manner shown. The guide assembly 28b is thus maintained in alignment on the rail 36 by the engagement of the portions of the keeper wheel 84 which define the sides of the groove 152 against the rib 150.

Although FIG. 4 shows the inner vertical side of the channel 54 as defined by the web 44, the invention is not so limited. If desired, one of the channel 54 vertical sides could also be defined in part by the side of the bed 12.

The present invention further provides the cover 22 as an effective weather seal without the use of shock cord tie downs, resulting from the lowermost edge of the cover 22 locating adjacent the side bumper 42 when the cover 22 is extended.

While FIGS. 5 to 9 show a guide assembly 28 having plastic support wheels 64, the invention is not so limited. It is also possible that other metal, nylon or pneumatic or solid rubber wheels may be used with the present invention. Pneumatic wheels may, for example, be used to provide increased shock absorbency and ultimately prolong the enclosure system lifespan.

Although the manufacture of the rails 34,36 from aluminum advantageously provides simplified extrusion manufacturing and a cost effective material selection, the rails could also be made from welded steel components or other metal extrusions.

FIGS. 5 and 7 show the bumper flange 42 as comprising a generally rectangular bar of steel which extends the length of side 16, however, the invention is not so limited. If desired, the bumper could be provided as a single elongated, rounded or other shaped projection, or as a number of projections provided at longitudinally spaced locations along the sides 14,16.

While the invention has been described with reference to preferred embodiments, it is not so limited. Many modifications and variations will now occur to those skilled in the art. For a definition of the invention, reference may be made to the appended claims.

We claim:

1. A retractable tarp enclosure system for covering a top surface of a bed of trucks and trailers and the like comprising, two elongate rail means, one along each side of the bed, each said rail means having a generally flat upper load bearing surface, a plurality of generally U-shaped bow means, each having two legs connected by a central bight, and guide means at each end of the legs, each bow means laterally bridging the bed surface from one rail means to the other with the guide means engaging the rail means on each side of the bed for movement longitudinally along the rail means, each said guide means comprising, a support wheel for movably supporting the bow means, the support wheel being rotatable about a substantially horizontal axis and having a circumferential wheel surface which rotatably engages said upper surface as said guide means moves, alignment means for maintaining the circumferential wheel surface on said upper surface as said guide means is moved longitudinally, said alignment means including a guide wheel spaced below said upper surface and being rotatable about a substantially vertical axis to engage at least one of said rail means and said side of the bed and limit lateral movement of the support wheel, flexible cover means secured to successive bow means at spaced intervals along the cover means, whereby moving the bow means along the rail means relative to each other collapses or expands the cover means in an accordion-like fashion.

2. A retractable tarp enclosure system as claimed in claim 1, wherein the upper surface of each said rail means is substantially flush with the top surface.

3. A retractable tarp enclosure system as claimed in claim 1, wherein each said rail means further includes a generally horizontal supporting flange member projecting outwardly along each side of the bed, the supporting flange member defining said upper surface, and longitudinally extending bumper means spaced beneath said supporting flange member and projecting outwardly from the side of the bed.

4. A retractable tarp enclosure system as claimed in claim 3, wherein the supporting flange member of said rail means further includes a generally flat lower surface, and each said guide means further includes a bottom roller wheel rotatably engaging the lower surface to substantially prevent upward vertical movement of said guide means relative to the rail means.

5. A retractable tarp enclosure system as claimed in claim 4, wherein said flexible cover means extends downwardly from said bight to a lowermost edge spaced below the guide wheel.

6. A retractable tarp enclosure system as claimed in claim 4, wherein each said rail means further includes a longitudinally extending flange member, said flange member projecting downwardly from an outward portion of said supporting flange member a distance part way towards said bumper means, the flange member defining a vertical surface which on engagement by the guide wheel assists in limiting lateral movement of the support wheel outwardly.

7. A retractable tarp enclosure system as claimed in claim 6, wherein said rail means further includes a vertical web means extending downwardly from an inward portion of said supporting flange, the web means defining a vertical surface which on engagement by the guide wheel assists in limiting lateral movement of the support wheel inwardly.

8. A retractable tarp enclosure system as claimed in claim 6, wherein said guide means further includes a wheel carriage having a substantially vertical sidewall and a horizontal bottom wall, the guide wheel being rotatably mounted to said bottom wall, the support wheel being rotatably mounted to the vertical sidewall at a pivot spaced a distance above said bottom wall so that when the circumferential wheel surface engages the upper surface, the horizontal bottom wall locates between the bumper means and the flange member.

9. A tarp enclosure system as claimed in claim 1, wherein said top surface includes a first surface and a second surface displaced vertically above said first surface, each elongate rail means comprises a first and second rail segment, wherein the upper surface of each of the first and second rail segments are substantially flush with the first and second surfaces respectively, a first one of said bow means bridging said first surface and a second one of said bow means bridging said second surface, said first bow means spaced closest to said second surface and further including carriage track means on each side of the bed for supporting and carrying said second bow means thereon, said carriage track means movable with said first bow means into substantial alignment with second rail segments wherein the guide means of the second one of said bow means may be selectively moved to move the second bow means onto either the second rail segments or the carriage track means.

10. A retractable tarp enclosure system for covering a top bed surface of a truck or trailer bed comprising, two elongate rail means, one along each side of the bed, each said rail means including supporting flange means extending outwardly along each side of the bed, said supporting flange means having a generally horizontal load bearing upper surface, and a flange member extending downwardly from an outward edge portion of the supporting flange means, a plurality of generally U-shaped bow means, each bow means having two legs connected by a central bight, and guide means at each end of the legs, each bow means laterally bridging the bed surface from one rail means to the other with the guide means engaging the rail means on each side of the bed for movement longitudinally along the rail means, each said guide means comprising, a first pair of longitudinally spaced support wheels, each being rotatable about a substantially horizontal axis and having a circumferential wheel surface rotatably engaging said upper surface, guide wheel means for maintaining the pair of support wheels on the upper surface, the guide wheel means being rotatable about a substantially vertical axis and engaging at least one of said rail means and said side of the bed to substantially prevent lateral movement of said guide means, flexible cover means secured at one end to secure to successive bow means at spaced intervals along the cover means, whereby moving an endmost bow means along the track collapses or expands the cover means in an accordion-like fashion.

11. A tarp enclosure system as claimed in claim 10, wherein the upper surface of each said supporting flange means is substantially co-planar with the bed surface.

12. A tarp enclosure system as claimed in claim 10, wherein each supporting flange means further includes a generally horizontal lower surface, and each said guide means further comprises bottom wheel means rotatable about a substantially horizontal axis, the bottom wheel means engaging the lower surface to limit upward vertical movement of said guide means relative the rail means.

13. A tarp enclosure system as claimed in claim 12, wherein said support wheels each have a radial diameter of at least 3 inches.

14. A retractable tarp enclosure system as claimed in claim 10, wherein each rail means further comprises bumper means extending longitudinally beneath the supporting flange means, the bumper means projecting laterally outwardly from the bed a distance beyond said bow means.

15. A retractable tarp enclosure system as claimed in claim 14, wherein each flange member projects downwardly from said supporting flange means a distance part way towards said bumper means, the flange member defining a vertical surface which is engagable by the guide wheel means to assist in limiting lateral movement of said support wheels on the upper surface.

16. A retractable tarp enclosure system as claimed in claim 15, further including a wheel carriage having a generally L-shaped profile with a substantially vertical sidewall and a horizontal bottom wall, the guide wheel means comprising a roller wheel rotatably mounted to said bottom wall, the support wheels rotatably mounted to the vertical sidewall at respective pivots spaced a distance from said bottom wall which is selected so that when the circumferential wheel surface of each support wheel engages the upper surface, the horizontal bottom wall extends between the bumper means and the flange member.

17. A retractable tarp enclosure system as claimed in claim 16, wherein said flexible cover means extends downwardly from said bight to a lowermost edge portion adjacent said bumper means.

18. A retractable tarp enclosure system as claimed in claim 10, wherein said flexible cover means extends downwardly from said bight to a lowermost edge spaced below the guide wheel means, and said bow means is pivotally connected to said guide means.

19. A retractable tarp enclosure system for covering a top surface of a bed of trucks and trailers and the like comprising, two parallel elongate rails each extending in a longitudinal direction, one along each side of the bed, each said rail having a generally flat load bearing upper surface, each rail along said side further including a first substantially vertical surface and a second substantially vertical surface;

a plurality of generally U-shaped bows, each having two legs connected by a central bight, and guide means at each end of the legs, each bow laterally bridging the top surface from one rail to the other with the guide means engaging the rail on each side of the bed for movement longitudinally along the rail, each said guide means comprising, a support wheel for movably supporting the bow means, the support wheel being rotatable about a substantially horizontal axis and having a circumferential wheel surface which rotatably engages said upper surface as said guide means moves, an alignment mechanism for maintaining the circumferential wheel surface on said upper surface as said guide means is moved longitudinally, said alignment mechanism including a guide wheel rotatable about a substantially vertical axis and spaced below said upper surface, said guide wheel having an outer circumferential surface directed outwardly relative to the axis for engaging both the first and second substantially vertical surfaces of said rail to limit lateral movement of the support wheel, a flexible cover secured to successive bows at spaced intervals along the cover, whereby moving the bows along the rails relative to each other collapses or expands the cover in an accordion-like fashion.

20. A retractable tarp enclosure system as claimed in claim 19, wherein said support wheel has a radial diameter of at least three inches.

21. A tarp enclosure system as claimed in claim 19 further including a longitudinally extending bumper spaced beneath each rail and the alignment mechanism, the bumper projecting laterally outwardly from each side of the bed past the upper surface of said rail.

* * * * *